United States Patent [19]
Makino et al.

[11] Patent Number: 5,821,745
[45] Date of Patent: Oct. 13, 1998

[54] SENSOR SIGNAL PROCESSOR HAVING ACCURATE DIGITIZING CAPABILITIES

[75] Inventors: Yasuaki Makino, Okazaki; Susumu Kuroyanagi, Anjo; Tomoatsu Makino, Okazaki, all of Japan

[73] Assignee: Nippondenso Co., Ltd., Kariya, Japan

[21] Appl. No.: 584,069

[22] Filed: Jan. 11, 1996

[30] Foreign Application Priority Data

Jan. 12, 1995 [JP] Japan ................................ 7-003381

[51] Int. Cl.⁶ .......................... G01B 7/30; G01D 5/244; G01P 3/481; H03K 5/08
[52] U.S. Cl. .............. 324/207.25; 324/166; 324/207.21; 327/309; 327/323; 327/516
[58] Field of Search ..................... 324/173, 174, 324/166, 160, 207.2–207.26; 327/510, 516, 306, 309, 316, 312, 323; 364/565, 566

[56] References Cited

U.S. PATENT DOCUMENTS

| | | | |
|---|---|---|---|
| 4,119,918 | 10/1978 | Moser | 327/510 |
| 5,148,170 | 9/1992 | Leopold et al. | 341/157 |
| 5,493,219 | 2/1996 | Makino et al. | 324/207.25 |
| 5,729,127 | 3/1998 | Tamura et al. | 324/174 |

FOREIGN PATENT DOCUMENTS

| | | |
|---|---|---|
| 4-69986 | 3/1992 | Japan . |
| 4-77671 | 3/1992 | Japan . |

OTHER PUBLICATIONS

"Electronics One–Seven", Harry Mileaf, Hayden Book Company, Inc. 1967, pp. 7–25, 26.

Primary Examiner—Gerard R. Strecker
Attorney, Agent, or Firm—Cushman Darby & Cushman IP Group of Pillsbury Madison & Sutro LLP

[57] ABSTRACT

Magnetoresistive elements are disposed facing a gear to form a sensor for detecting rotation of the gear. The signal output from MRE sensor is an alternating amplitude signal. An operational amplifier has a differential gain exceeding its operational limit relative to the amplitude value of the sensor signal, and it amplifies and outputs the difference between the sensor signal and a reference voltage. Comparators judge whether an output of the operational amplifier is within a predetermined amplitude range relative to the amplitude center thereof. When the op-amp output deviates from the predetermined amplitude range, transistors either charge or discharge a capacitor, so that the reference voltage can be changed closer to the output of the operational amplifier. Another comparator compares the output signal of the operational amplifier with a threshold value to output a binary-valued signal.

16 Claims, 7 Drawing Sheets

SENSOR SIGNAL PROCESSOR HAVING ACCURATE DIGITIZING CAPABILITIES

BACKGROUND OF THE INVENTION

1. Field of the Invention

The present invention relates to a sensor signal processing unit that outputs a binary value signal by processing a sensor signal of an MRE (magnetoresistive element) sensor or an image sensor.

2. Related Arts

A rotational position sensor having a magnetoresistive element (hereinafter refereed to as an MRE) in which a gear 50 is fixed on a rotator the rotation of which is to be detected, and a sensing element 51 with the MRE provided thereon disposed to face the teeth of the gear 50 as shown in FIG. 7 is well known. The rotational position sensor converts the passage of the teeth of the gear 50 by the rotation of the gear 50 into an electric signal by means of the MRE. An output of the MRE, i.e., sensing element 51, is, as shown with the solid line in FIG. 8, an alternating signal responsive to the passage of the teeth of the gear 50. The signal processing unit of this sensor includes an amplifier 52 and a comparator 53. An output signal of the sensing element 51 is amplified by the amplifier 52 and the amplified signal is converted to a binary-pulse signal by the comparator 53. By counting this pulse signal, the rotational position is detected. Herein, a sensor signal processing unit having much higher detecting precision has been demanded.

SUMMARY OF THE INVENTION

A primary objective of the present invention is to provide a sensor signal processing unit capable of converting a sensor signal to a binary value with high precision.

As shown in FIG. 9, a sensor signal processing unit according to the present invention includes: an amplifier circuit having a differential gain set so as to exceed an operational limit value with respect to an amplitude value of an alternating sensor output signal from a sensor, the amplifier circuit receiving the sensor output signal and a reference voltage to amplify and output a difference between the sensor output signal and the reference voltage; and a converting circuit converting an output signal from the amplifier circuit into a binary value signal by comparing it with a threshold value.

According to the present invention, the amplifier circuit amplifies and outputs the difference between the alternating sensor output signal from the sensor and the reference voltage. If the amplified value exceeds the operational limit of the amplifier because of the large differential gain, the output signal from the amplifier circuit is clamped at the operational limit value. Furthermore, the amplifier circuit amplifies the sensor output signal by the large differential gain thereof so that a waveform of the output signal from the amplifier circuit sharply rises or falls (decays) to the operational limit value in accordance with the variation of the sensor output signal.

By comparing the output of the amplifier circuit with a threshold value in a converting circuit, a sensor output signal can be converted into a binary signal with high precision.

Furthermore, in the above construction, it is preferable to further install a reference voltage changing circuit which judges whether the output of the amplifier circuit is within a predetermined amplitude range and changes the reference voltage closer to the output of the amplifier circuit when the output deviates from the predetermined range.

When, as shown by the broken line in FIG. 7, for example, a fixing position of the sensor element 51 shifts from the regular position, the amplitude center of the sensor output signal fluctuates as shown by the broken line in FIG. 8. In this case, the output or signal amplified by the amplifier circuit tends to reach the operational limit value. By the above construction, however, because the reference voltage is changed to a value closer to the output of the amplifier circuit, the amplified signal is prevented from tending to reach and keep the operational limit value.

Accordingly, even a sensor output signal with a different amplitude center can be converted to a binary value with high precision.

BRIEF DESCRIPTION OF THE DRAWINGS

These and other objects, features and characteristics of the present invention will be appreciated from a study of the following detailed description, the appended claims, and drawings, all of which form a part of this application. In the drawings:

DETAILED DESCRIPTION OF THE PRESENTLY PREFERRED EXEMPLARY EMBODIMENTS

A first embodiment of the present invention is hereafter described with reference to the accompanying drawings.

Figure 1:
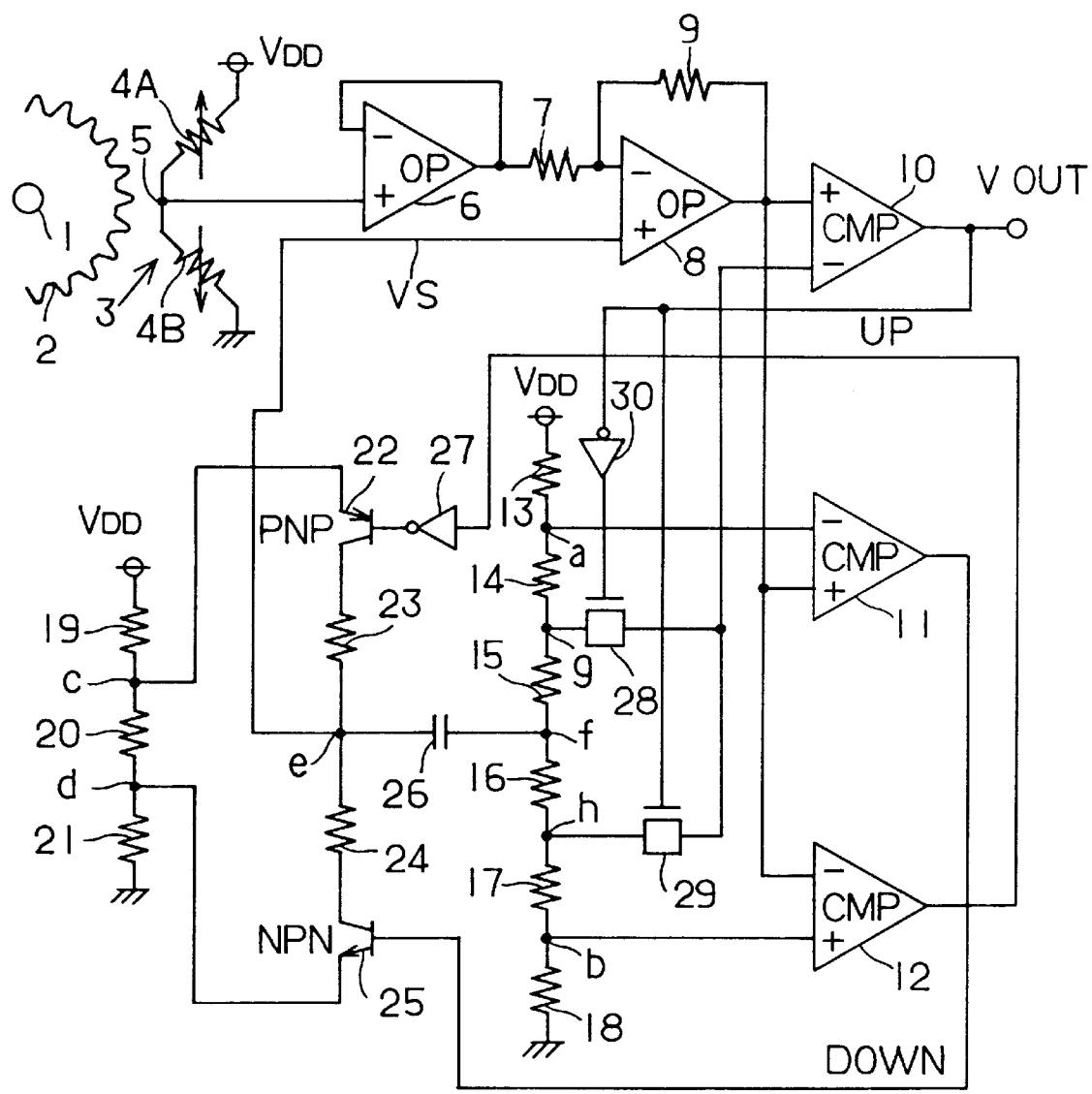
FIG. 1 is a schematic circuit diagram of a sensor signal processing unit according to a first embodiment of the present invention.

FIG. 1 shows a circuit construction of a sensor signal processing unit according to a first embodiment of the present invention. The sensor signal processing unit according to the embodiment is a device that detects the rotational position of an engine.

A sensor includes an MRE sensor 3 which comprises magnetoresistive elements (MRE) 4A and 4B positioned proximate to a gear 2.

A shaft 1 is driven by a crankshaft (not shown) of the engine (also not shown). With the operation of the engine, the shaft 1 rotates at a half speed of the crankshaft of the engine. The gear 2 is fixed on the shaft 1. A pair of MREs 4A and 4B are disposed facing the gear 2 with a predetermined space (air gap) interposed therebetween. The MREs 4A and 4B are connected in series to a 5 V power source $V_{DD}$ and comprise a variable voltage divider circuit (a bridge circuit). The MREs 4A and 4B change their resistance values in accordance with the change of the magnetic field direction imparted by the rotation of the gear 2. As a result, the voltage of a middle point 5 between the MREs 4A and 4B changes, and the potential of the middle point 5 is output as a sensor output signal. The sensor output signal is an alternating signal, which varies in the range of 10–50 mV, i.e., when the teeth of the gear 2 approaches closest to the MREs, the output will be approximately 50 mV, and when the MREs are furthest away from the teeth of the gear 2, the output will be approximately 10 mV.

The MRE sensor 3 having the above-described structure is connected to the following signal processing unit.

An operational amplifier 6, the output of which is input as negative feedback to form a buffer circuit, is connected to the middle point 5 between the MREs 4A and 4B. An impedance conversion of the sensor output signal is performed by the operational amplifier 6. That is, the operational amplifier 6 presents a low-impedance input to the rest of the circuit. The output terminal of the operational amplifier 6 is connected to the inverting input terminal of an operational amplifier 8 via a resistor 7 (the resistance value is 1 kΩ in the present embodiment). The output of the operational amplifier 8 is negatively fed back via a resistor 9 (the resistance value is 500 kΩ in the present embodiment) and is connected to the non-inverting input terminal of a comparator 10. The differential gain of the operational amplifier 8 is 500. The operational amplifier 8 uses 5 V as the power source voltage $V_{DD}$ to make the lowest output therefrom 0 V and to make the highest output therefrom 4 V. Namely, the output signal of the operational amplifier 8 ranges from 0 V to 4 V.

As described above, the operational amplifier 8 has a differential gain (500) which exceeds the operational limit (the lowest: 0 V, the highest: 4V; voltage swing value: 4V) with respect to the voltage swing value (40 mV) of the alternating sensor output signal output from the sensor 3. The operational amplifier 8 amplifies and outputs the difference between the sensor output signal and a reference voltage VS as described below.

The output terminal of the operational amplifier 8 is connected to the non-inverting input terminal of a comparator for the upper limit detection 11 and also is connected to the inverting input terminal of a comparator for the lower limit detection 12.

Resistors 13, 14, 15, 16, 17 and 18 are connected in series to the 5V power source $V_{DD}$. A connecting point a between the resistors 13 and 14 is connected to the inverting input terminal of the comparator for the upper limit detection 11, i.e., the comparator for the upper limit detection 11 compares the output voltage of the operational amplifier 8 with divided voltage (=3.5 V) at the connecting point a. A connecting point b between the resistors 17 an 18 is connected to the non-inverting input terminal of the comparator for the lower limit detection 12, i.e., the comparator for the lower limit detection 12 compares the output voltage of the operational amplifier 8 with divided voltage (=0.5 V) at the connecting point b.

Accordingly, two comparators 11 and 12 judge whether the output of the operational amplifier 8 is within the predetermined amplitude range (0.5 V~3.5 V) relative to the amplitude center in an alternating signal output by the operational amplifier 8. When it deviates from the range, the comparators 11 or 12 output a high-level signal.

Also, resistors 19, 20 and 21 are connected in series to the 5V power source $V_{DD}$. A connecting point c is between the resistors 19 and 20, and a connecting point d is between the resistors 20 and 21. A PNP transistor 22, resistors 23 and 24, and an NPN transistor 25 are connected in series between the connecting points c and d. The potential of the connecting point c is 3.8 V, while the potential of the connecting point d is 0.2 V.

A connecting point e is between resistors 23 and 24, while a connecting point f is between resistors 15 and 16. A capacitor 26 is connected between the connecting points e and f. The connecting point e is also connected to the non-inverting input terminal of the operational amplifier 8 and the potential of the connecting point e becomes the reference voltage VS input to the operational amplifier 8.

The output terminal of the comparator for the upper limit detection 11 is connected to the base of the NPN transistor 25. Therefore, when the output terminal of the comparator for the upper limit detection 11 goes high, the NPN transistor 25 is turned on, the electric charge accumulated in the capacitor 26 is discharged to ground until the capacitor 26 reaches the potential at the connecting point d (=0.2 V). Accordingly, the potential at the connecting point e decreases in accordance with the discharge of the capacitor 26 and then is clamped at the lower limit value SDL (see FIG. 2E). The reference voltage VS varies in accordance with the change in the potential at the connecting point e.

On the other hand, the output terminal of the comparator for the lower limit detection 12 is connected to the base of the PNP transistor 22 via an inverter 27. Therefore, when the output terminal of the comparator for the lower limit detection 12 goes high, the PNP transistor 22 is turned on, and thus the capacitor 26 is charged until the capacitor 26 reaches the potential at the connecting point c (=3.8 v). The potential at the connecting point e increase in accordance with the charge of the capacitor 26 and then is clamped at the upper limit value SDH (see FIG. 2E), and thereby the reference voltage VS varies in accordance with the change in the potential at the connecting point e.

As described above, the output signals of the above-described comparators 11 and 12 turns on or off the transistors 25 and 22, respectively, and thus the voltage of the capacitor 26, i.e., the reference voltage VS of the operational amplifier 8, is changed. More specifically, the high-level signal from the comparator for the upper limit detection 11 lowers the reference voltage VS, while the high-level signal from the comparator for the lower limit detection 12 raises the reference voltage VS.

The inverting input terminal of the comparator 10 is connected to a connecting point g between the resistors 14 and 15 via an analog switch 28, and also connected to a connecting point h between the resistors 16 and 17 via an analog switch 29. The output terminal of the comparator 10 is connected to a control terminal of the analog switch 29 and also connected to a control terminal of the analog switch 28 via an inverter 30. Preferably, analog switches 28 and 29 are suitably composed of, e.g., transistors. When the output of the comparator 10 is high level, the analog switch 29 turns on while the analog switch 28 turns off. When the output of the comparator 10 is low level, the analog switch 28 turns on while the analog switch 29 turns off. When the analog switch 29 turns on an the analog switch 28 turns off, the divided voltage TL (see FIG. 2F) at the connecting point h is set as a threshold voltage of the comparator 10. When the analog switch 28 turns on and the analog switch 29 turns off, the divided voltage TH (see FIG. 2F) at the connecting point g is set as the threshold voltage of the comparator 10.

In the present embodiment, an input terminal of an amplifier circuit to which is applied a reference voltage includes the non-inverting input terminal of the operational amplifier 8. The comparator 10 makes up a converting circuit. A reference voltage changing circuit is composed of the comparator for the upper limit detection 11, the comparator for the lower level limit detection 12, the PNP transistor 22, the NPN transistor 25, and the capacitor 26. Furthermore, a capacitor voltage adjusting circuit is composed of the comparator for the upper limit detection 11, the comparator for the lower limit detection 12, the PNP transistor 22 and the NPN transistor 25.

Next, the operation of the sensor signal processing unit having the aforementioned structure is describe with reference to FIGS. 2A through 2G. FIGS. 2A through 2G show signal waveforms of sensor output signal (output of the operational amplifier 6), output signal of the operational amplifier 8, output signal of the comparator 11, output signal of the comparator 12, reference voltage VS, threshold voltage T, and output $V_{OUT}$ of the comparator 10, respectively.

An alternating signal is output as a middle point voltage (a sensor output signal) of the bridge circuit by the rotation of the gear 2. The output is 10 mV at minimum and 50 mV at maximum. The sensor output is input to the operational amplifier 8 via the operational amplifier 6. The operational amplifier 8 amplifies the sensor output 500 times which is determined by the amplifier gain thereof, so that the amplitude will be enlarged to 5 V–2.5 V; however, the output voltage of the operational amplifier 8 does not exceed the operational limits thereof (0 V and 4 V).

First, an explanation will be given about the case when the sensor output signal falls from the amplitude center thereof. The output of the operational amplifier 8 is compared with the upper limit voltage PS (=3.5 V) which is generated by dividing a voltage at the resistors 13 through 18 in the comparator for the upper limit detection 11. When the output of the operational amplifier 8 exceeds the upper limit voltage PS (timing t1 in FIGS. 2A–2G and 3), the output of the comparator for the upper limit detection 11 goes high as shown in the enlarged diagram of FIG. 3 to turn on the NPN transistor 25. Electric charge accumulated in the capacitor 26 is discharged to ground to lower both the reference voltage VS and the output of the operational amplifier 8. When the output of the operational amplifier 8 falls below the upper limit voltage PS (timing t2 in FIG. 3), the output of the comparator for the upper limit detection 11 goes low to turn off the NPN transistor 25. While this adjusting operation is repeated (period t1–t3), the output of the operational amplifier 8 is kept substantially constant irrespective of the decrease of the sensor output signal.

When the voltage on capacitor 26 reaches 0.2 V which is an electric potential at the connecting point d and the reference voltage VS reaches the lower limit value SDL, the adjusting operation to lower the reference voltage VS is not carried out anymore. The output of the comparator for the upper limit detection 11 stays high to keep the NPN transistor 25 turned on (timing t3). When the sensor output decreases much further, the output of the operational amplifier 8 increases up to the upper operational limit, i.e., 4V (timing t4). Then, because the output of the operational amplifier 8 cannot go above the upper operational limit of the operational amplifier 8, the output voltage is clamped at the upper operational limit value and becomes constant (period t4–t5).

After the sensor output signal turns from decrease to increase, the output of the operational amplifier 8 starts falling (after timing t5) when the sensor output reaches a certain voltage BL. Then, when the output of the operational amplifier 8 decreases below the upper limit voltage PS (timing t6), the output of the comparator for the upper limit detection 11 goes low to turn off the NPN transistor 25.

Figure 4:
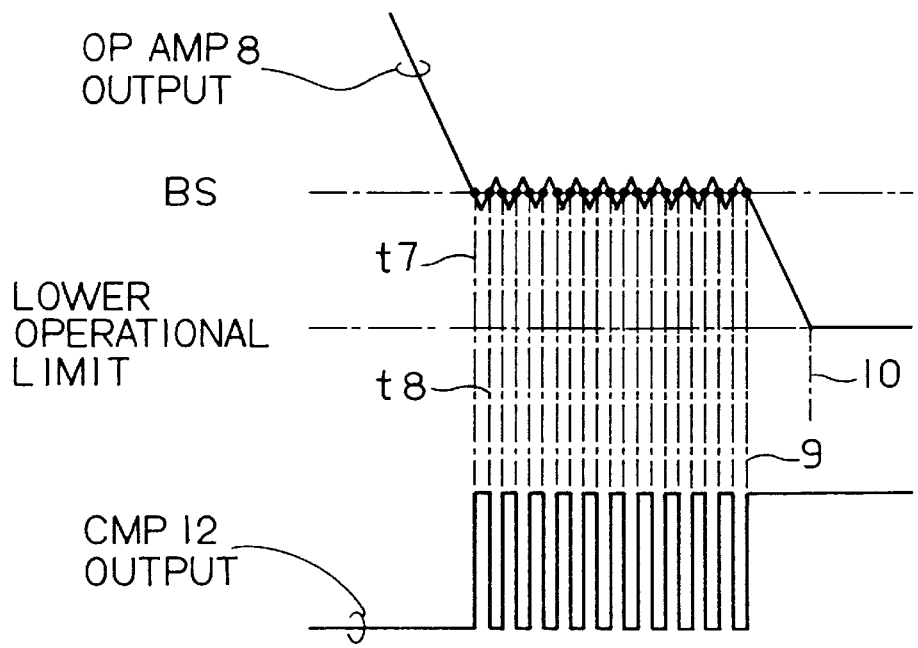
FIG. 4 is an explanatory diagram for explaining the relationship between the output of the operational amplifier 8 and the output of the comparator 12.

When the sensor output increases, passing the amplitude center thereof, the output of the operational amplifier 8 is compared with the lower limit voltage BS (=0.5 V) which is generated by dividing a voltage at resistors 13 through 18 in the comparator for the lower limit detection 12. The output of the operational amplifier 8 changes (decreases) 500 times as much as the sensor output until the output of the operational amplifier 8 reaches the lower limit voltage BS. When the output of the operational amplifier 8 reaches the lower limit voltage BS (timing t7), the output of the comparator for the lower limit detection 12 goes high as shown in the enlarged diagram of FIG. 4 to turn on the PNP transistor 22. Then, a charging operation of the capacitor 26 from the connecting point c is performed to raise the reference voltage VS and to raise the output of the operational amplifier 8. When the output of the operational amplifier 8 becomes higher than the lower limit voltage BS (timing t8 in FIG. 4), the output of the comparator for the lower limit detection 12 goes low to turn off the PNP transistor 22. While this adjustment operation is repeated (period t7–t9), the output of the operational amplifier 8 is kept substantially constant irrespective of increase of the sensor output.

When the capacitor voltage becomes 3.8 V which is a potential at the connecting point e and the reference voltage VS reaches the upper limit value SDH, the adjusting operation to increase the reference voltage VS is not carried out any more, and the output of the comparator for the lower limit detection 12 stays at a high level to keep the PNP transistor 22 turned on (timing t9). Then, when the sensor output increases much further, the output of the operational amplifier 8 decreases to the lower operational limit, i.e., 0 V (timing t10).

Even if the sensor output further increases, the amplifier output, i.e., the output of the operational amplifier 8, is clamped at the lower operational limit value of 0 V (period t10–t11).

After the sensor output turns from increase to decrease, the amplifier output starts increasing (after timing t11) when the sensor output reaches a certain voltage PL. Then, when the output of the operational amplifier 8 increases to exceed the lower limit voltage BS (timing t12), the output of the comparator for the lower limit detection 12 goes low to turn off the PNP transistor 22.

Figure 2:
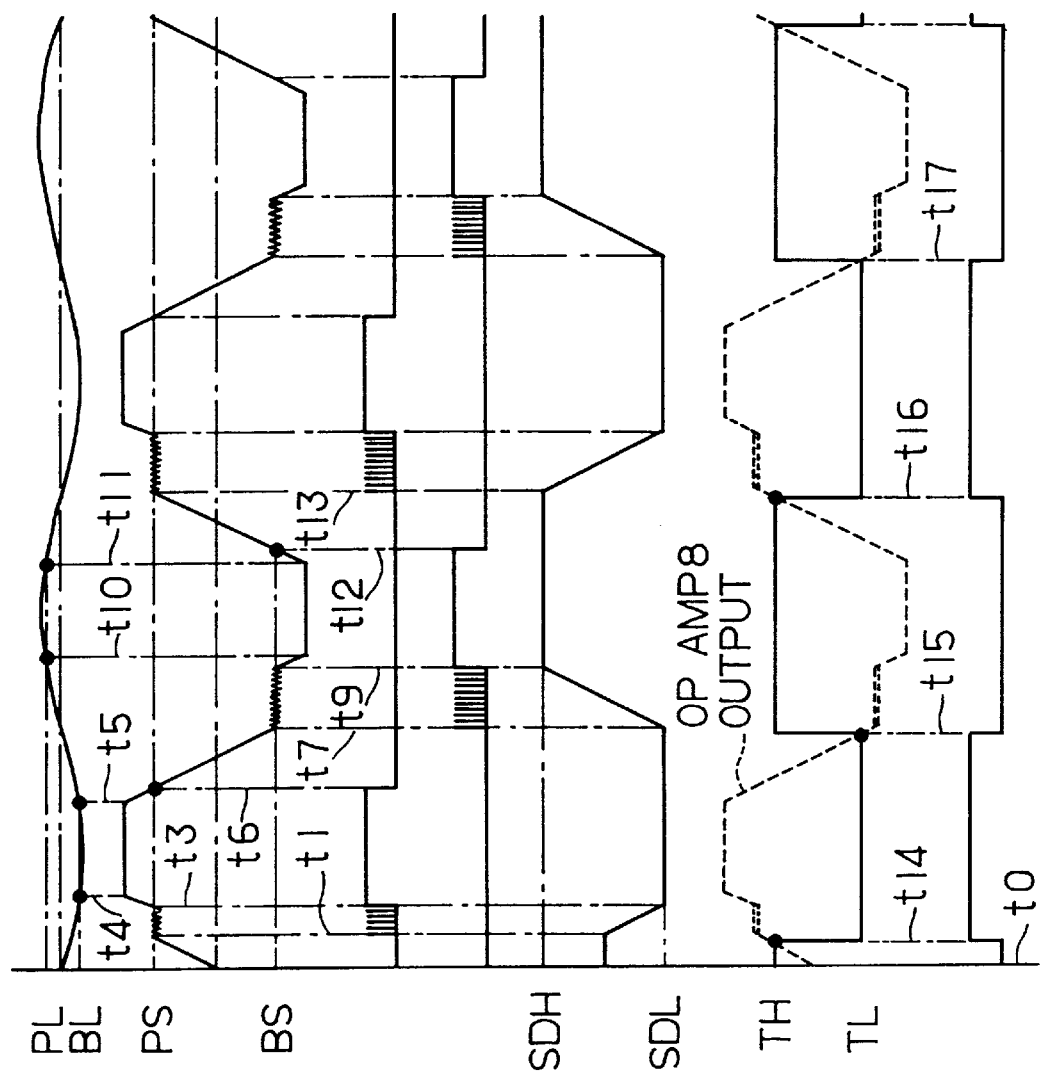
FIGS. 2A through 2G are waveform diagrams of various output signals in the circuit of FIG. 1.
Figure 3:
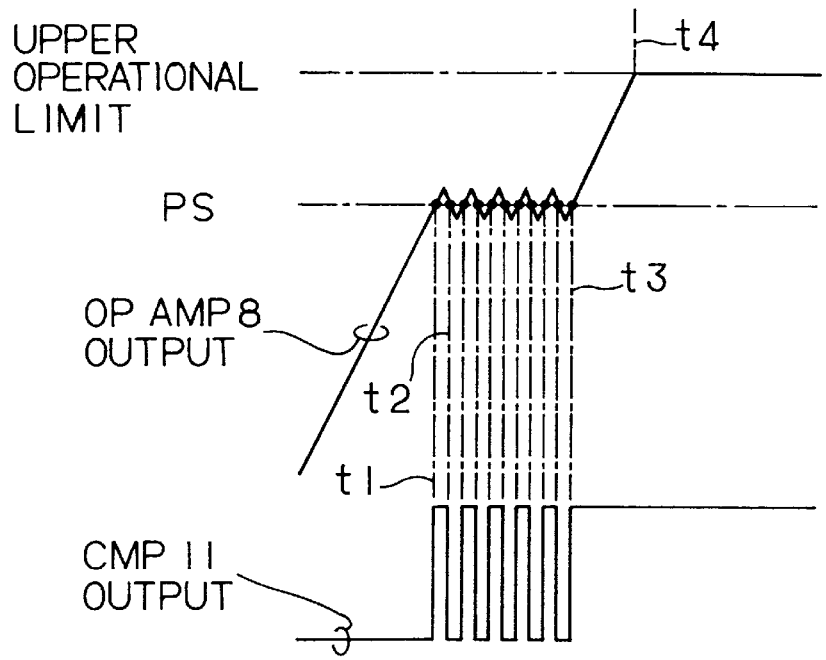
FIG. 3 is an explanatory diagram for explaining the relationship between the output of the operational amplifier 8 and the output of the comparator 11.

As described above, the output of the operational amplifier 8 changes between the upper and lower operational limits as shown in FIG. 2B. The sensor output is amplified by 500 times by the operational amplifier 8 during the periods of t5–t7 and t11–t13 in one cycle of the sensor output signal.

The comparator 10 compares the output of the operational amplifier 8 (FIG. 2B) with the threshold voltage T (FIG. 2F) and outputs an output signal $V_{OUT}$ inverted at the timings of t14–t17 as shown in FIG. 2G. At this time, the analog switches 28 and 29 operate to change the threshold voltage T according to the inversion operation of the output $V_{OUT}$ of the comparator 10. A processing circuit (not shown) in the subsequent stage counts the number of pulse signals output by the comparator 10 to convert the counted number to a crank angle.

According to the present embodiment, the operational amplifier 8 has a different gain sufficient to exceed the operational limit of the amplifier with respect to the input sensor output of the alternating signal. That is to say, when the amplified value exceeds the operational limit, the amplified value is maintained at the operational limit value. Accordingly, the sensor output signal is shaped by the operational amplifier 8 into a signal which varies in accordance with the variation of the sensor output and has a short rise time and short decay time defined in association with the large differential gain. More specifically, during the periods t5–t7 and t11–t13 in one cycle of the sensor output signal, the operational amplifier 8 differentially amplifies the sensor output by 500 times to convert it into a signal changing sharply near the amplitude center thereof. Thus, the sensor output signal can be converted to a binary-valued signal with high precision.

Figure 7:
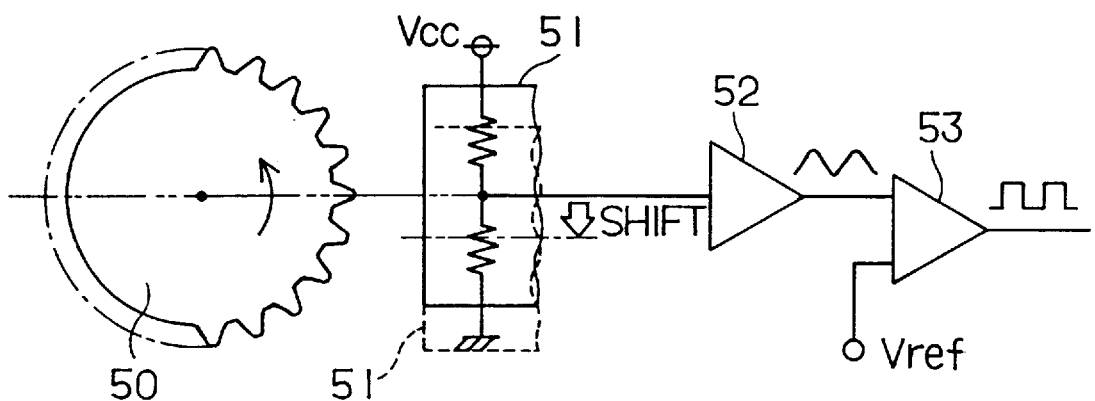
FIG. 7 is a schematic diagram of a conventional sensor signal processing unit.
Figure 8:
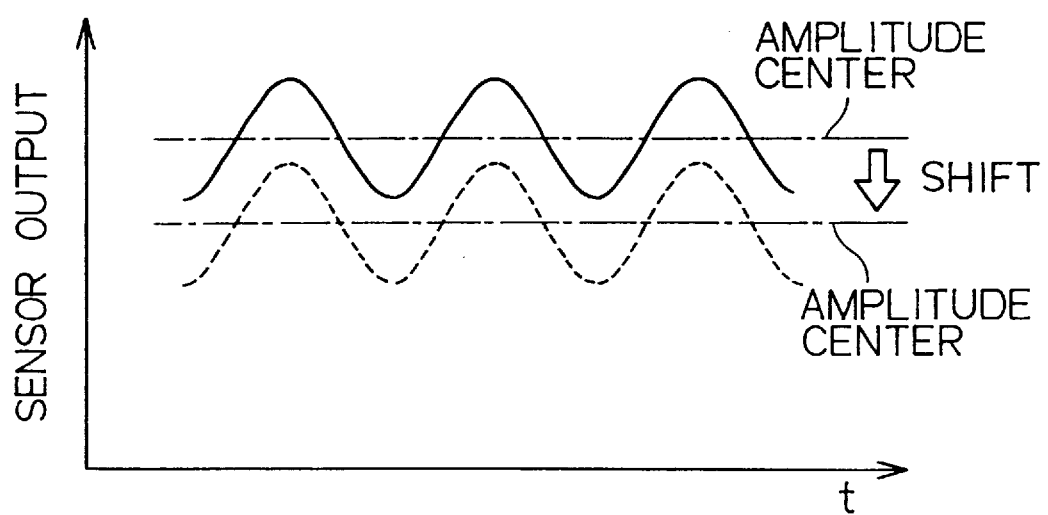
FIG. 8 is a waveform diagram for explaining the shift of the sensor output signal in FIG. 7.
Figure 9:
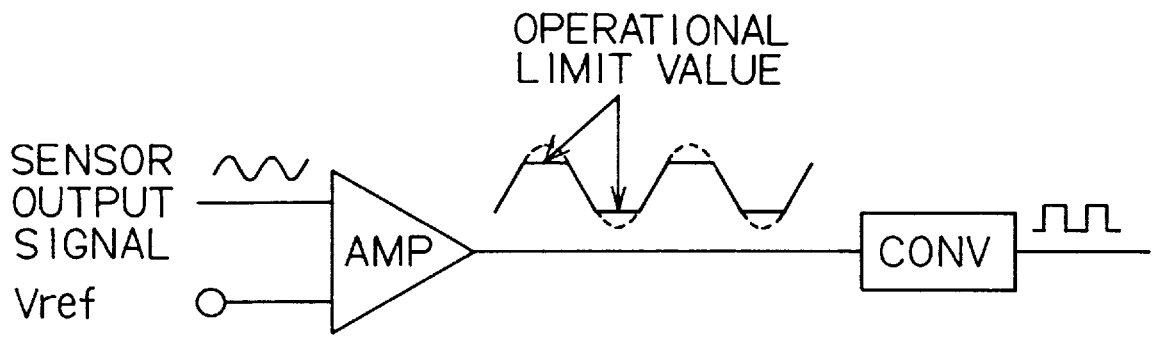
FIG. 9 is an explanatory diagram showing a basic construction of the present invention.

The comparators 11 and 12 judge whether the amplitude of the output of the operational amplifier 8 is within a predetermined amplitude range. When the amplified output deviates from the range, the comparators 11 and 12 change the reference voltage VS closer to the output of the operational amplifier 8 in association with the charge/discharge operation of the capacitor 26 connected to the connecting point f. If the position of the sensor element 51 shifts from the regular position as shown by the broken line in FIG. 7, the amplitude center of the sensor output signal fluctuates as shown by the broken line in FIG. 8, and thus, the sensor output signal is simply differentially amplified, the amplified signal tends to be the operational limit value. However, according to the embodiment, the reference voltage VS is also changed to a value closer to the output of the operational amplifier 8 to self-offset the fluctuation of the output of the operational amplifier 8 due to the shift of the fixing position, and thereby the amplified signal is prevented from tending to become the operational limit value. Therefore, even a sensor output signal having a different amplitude center can be changed to a binary-valued signal with high precision and reliability. In other words, even if an assembling error of the sensor element 3 exists, a sensor output signal therefrom can be changed to a binary value with high precision and reliability.

Herein, because the comparators 11 and 12 and the transistors 22 and 25 are used to charge or discharge the capacitor 26 connected to the non-inverting input terminal (an input terminal for applying a reference voltage) of the operational amplifier 8, for changing the reference voltage VS, the reference voltage changing circuit includes an analog processing circuit, and thus it can be miniaturized on a single chip.

Figure 5:
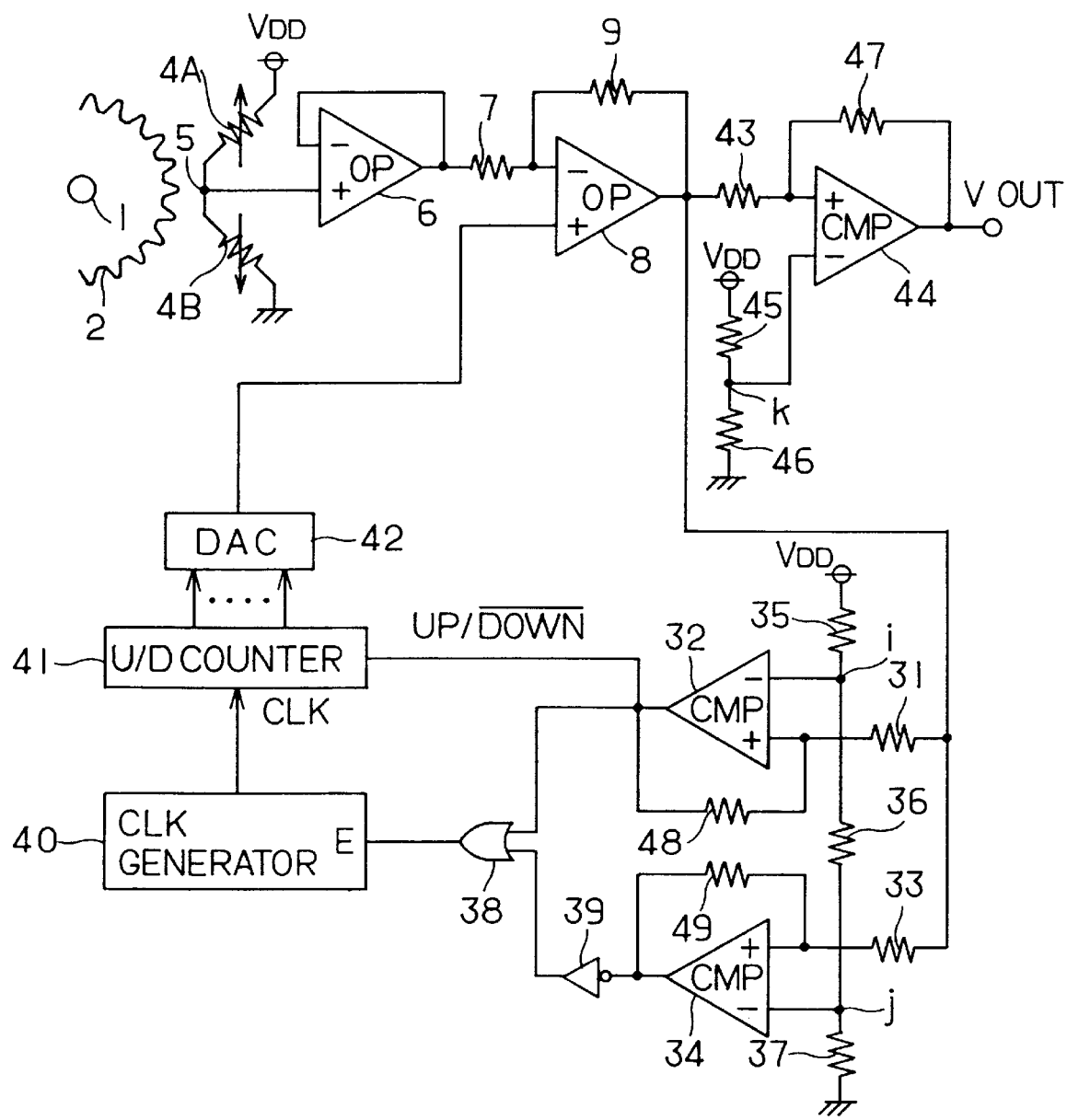
FIG. 5 is a schematic circuit diagram of a sensor signal processing unit according to a second embodiment of the present invention.

Next, FIG. 5 shows a sensor circuit according to a second embodiment of the present invention. In the following explanation, the main differences between the first and the second embodiments are described.

The first embodiment adopts an analog-type circuit; however, the second embodiment adopts a digital-type circuit.

As shown in FIG. 5, the output terminal of the operational amplifier 8 is connected to the non-inverting input terminal of a comparator for upper limit detection 32 via a resistor 31. The output terminal of the operational amplifier 8 is also connected to a non-inverting input terminal for lower limit detection 34 via a resistor 33.

Resistors 35, 36 and 37 are connected in series to a 5 V power source $V_{DD}$. A connecting point i between the resistors 35 and 36 is connected to the inverting input terminal of the comparator for the upper limit detection 32, i.e., the comparator for the upper limit detection 32 compares the output voltage of the operational amplifier 8 with a divided voltage (=3.5 V) at the connecting point 1. A connecting point j between the resistors 36 and 37 is connected to the inverting input terminal of the comparator for the lower limit detection 34, i.e., the comparator for the lower limit detection 34 compares the output voltage of the operational amplifier 8 with a divided voltage (=0.5 V) at the connecting point j.

The output terminal of the comparator for the upper limit detection 32 is connected to one of the input terminals of an OR gate 38. The output terminal of the comparator for the lower limit detection 34 is connected to the other input terminal of the OR gate 38 via an inverter 39. The output terminal of the OR gate 38 is connected to an enabling terminal E of an RC oscillation circuit 40 for generating a clock signal. When a high level signal is input from the OR gate 38 to the RC oscillation circuit 40, the RC oscillation circuit 40 becomes active to output the clock signal to an up/down counter 41. The up/down counter 41 is connected to the output terminal of the comparator for the upper limit detection 32. When a high level signal is input from the comparator for the upper limit detection 32, the up/down counter 41 inputs the clock signal to raise the counted value. When a high level signal is not input from the comparator for the upper limit detection 32, the up/down counter 41 inputs the clock signal to lower the counted value.

The output of the up/down counter 41 and the input of a digital/analog conversion circuit (DAC) 42 are connected to each other bit-by-bit with signal lines. A signal corresponding to the counted value of the up/down counter 41 is sent to the digital/analog conversion circuit 42. The digital/analog conversion circuit 42 outputs the voltage corresponding to the counted value of the up/down counter 41 to the non-inverting input terminal of the operational amplifier 8 as a reference voltage VS.

The output terminal of the operational amplifier 8 is connected to the non-inverting input terminal of a comparator 44 via a resistor 43. The output of the comparator 44 is provided as an input via positive feedback via a resistor 47 (100 Ω in the present embodiment).

Resistors 45 and 46 are connected in series to a 5V power source $V_{DD}$. A connecting point k between the resistors 45 and 46 is connected to the inverting input terminal of the comparator 44. A divided voltage (=2.0 V) at the connecting point k is set as a threshold voltage of the comparator 44.

The output of the operator for the upper limit detection 32 is provided as positive feedback via a resistor 48 (100 Ω in the present embodiment), and the output of the comparator for the lower limit detection 34 is also provided as positive feedback via a resistor 49 (100 Ω in the present embodiment).

According to the present embodiment, a reference voltage changing circuit includes the comparator for the upper limit detection 32, the comparator for the lower limit detection 34, the RC oscillation circuit for generating a clock signal 40, the up/down counter 41, and the digital/analog conversion circuit 42. The up/down counter 41 makes up a counter circuit. A counted value changing circuit includes the comparator for the upper limit detection 32, the comparator for the lower limit detection 34, and the RC oscillation circuit for generating a clock signal 40.

The operation of a sensor signal processing unit having the above-described structure is hereafter explained with reference to FIGS. 6A and 6H which show timing charts of the various output signals.

Figure 6:
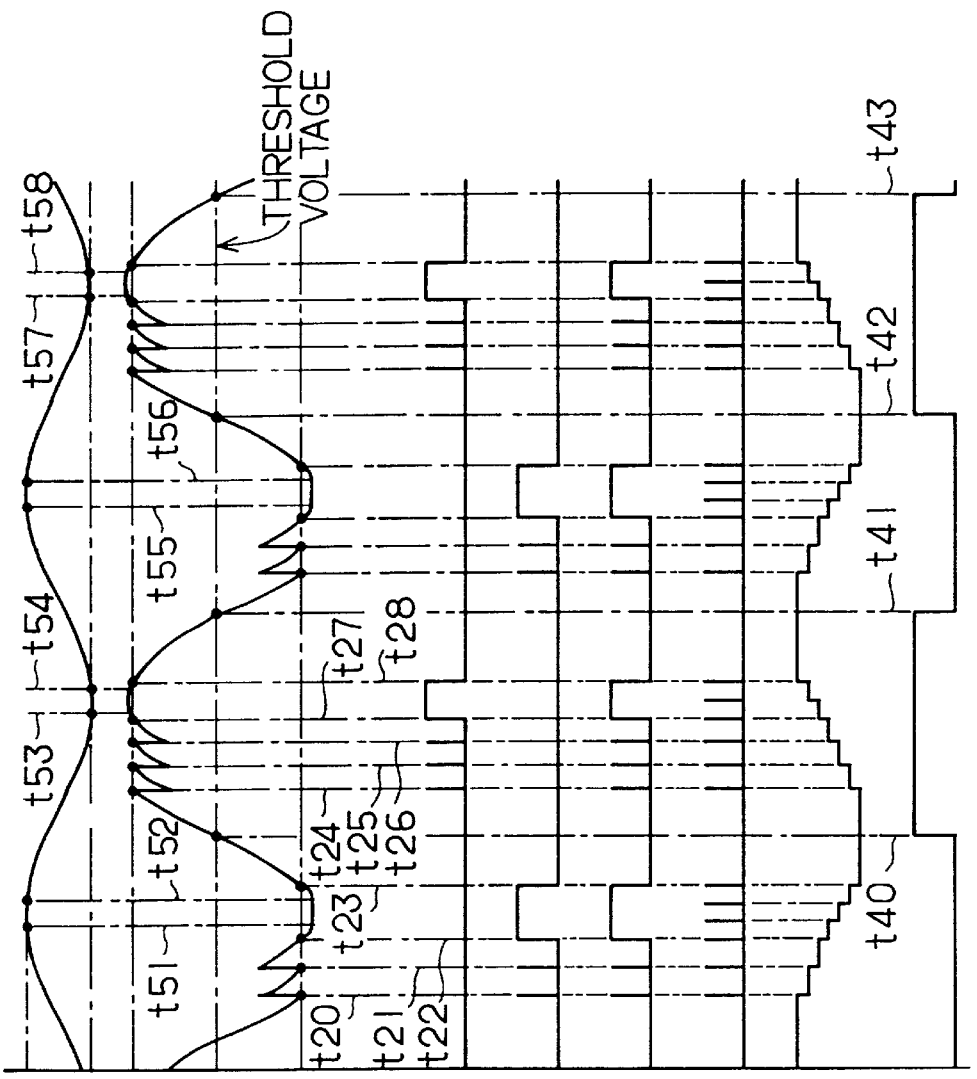
FIGS. 6A through 6B are waveform diagrams of various output signals in the circuit of FIG. 5.

FIG. 6A shows the output signal of the operational amplifier 6 (a sensor signal), FIG. 6B shows the output signal of the operational amplifier 8, FIG. 6C shows the output signal of the comparator for the upper limit detection 32, FIG. 6D shows the output signal of the comparator for the lower limit detection 34 (inverted by the inverter 39), FIG. 6E shows the output signal of the OR gate 38, FIG. 6F shows the output signal of the RC oscillation circuit for generating a clock signal 40, FIG. 6G shows the output signal of the digital/analog conversion circuit 42 (reference voltage VS) and FIG. 6H shows the output signal $V_{OUT}$ of the comparator 44.

When a sensor output signal increases, the output signal of the operational amplifier 8 decreases, which is compared with the lower limit voltage BS (=0.5 V) by the comparator for the lower limit detection 34. When the output signal of the operational amplifier 8 decreases below the lower limit voltage BS (timing t20), the output of the comparator for the lower limit detection 34 goes low and thus the output of the inverter 29 goes high as shown in FIG. 6D. Accordingly, an enabling signal (FIG. 6E) is output from the OR gate 38 to the RC oscillation circuit 40 to thereby output a generated clock signal to the up/down counter 41 as shown in FIG. 6F. In accordance with the generation of the clock signal, the up/down counter decreases the counted value by 1. As a result, the reference voltage VS, i.e., an output of the digital/analog conversion circuit 42, decreases by a predetermined voltage as shown in FIG. 6G. Therefore, the amplifier output (output of the operational amplifier 8) increases by 0.5 V and becomes 1 V.

A similar operation is performed at timing t21 in FIG. 6B. Then, when the output of the operational amplifier 8 goes below the lower limit voltage BS in association with the large differential gain thereof (period t22–t23), the inverted output of the comparator for the lower limit detection 34, i.e., the output of the inverter 39, becomes continuously high to output a clock signal from the RC oscillation circuit 40 to the up/down counter 41 every predetermined period. According to this, the counted value by the up/down counter 41 decreases and the reference voltage VS also decreases.

On the other hand, when the sensor output signal decreases, after it turns from the increase to decrease, the output of the operational amplifier 8 is compared with the upper limit voltage PS (=3.5 V) by the comparator for the upper limit detection 32. When the output of the operational amplifier 8 exceeds the upper limit voltage PS (timing t24), the output of the comparator for the upper limit detection 32 goes high (FIG. 6C) to output an enabling signal to the RC oscillation circuit 40 via the OR gate 38 as shown in FIG. 6E. By inputting the enabling signal, a clock signal is output from the RC oscillation circuit 40 to the up/down counter 41, and the counted value of the up/down counter 41 is increased by 1. As a result, the reference voltage VS, i.e., the output of the digital/analog conversion circuit 42, increases by determined voltage as shown in FIG. 6G. Therefore, the amplifier output, i.e., the output of the operational amplifier 8, decreases by 0.5 V and becomes 3 V as shown in FIG. 6B.

A similar operation is performed at timings t25 and t26 in FIG. 6B. Then, when the output of the operational amplifier 8 exceeds the upper limit voltage PS because of the large differential gain thereof (period t27–t28), the output of the comparator for the upper limit detection 32 goes continuously high as shown in FIG. 6C. According to this, the RC oscillation circuit 40 outputs a clock signal every predetermined time to the up/down counter 41 (FIG. 6F), the up/down counter 41 increases the counted value and thereby the reference voltage VS increases as shown in FIG. 6G.

The comparator 44 compares the output of the operational amplifier 8 with the threshold voltage (=2 V) and, as shown in FIG. 6H, outputs a signal inverted at the timings of t40, t41, t42 and t43 based on the comparison result.

Furthermore, as shown in FIG. 6B, the amplifier output reaches the lower operational limit or the upper operational limit and keeps a constant value defined by either the upper or lower operational limit during the periods of t51–t52, t53–t54, t55–t56 and t57–t58. That is to say, like the first embodiment, the output signal of the operational amplifier 8 has a waveform which decays or rises sharply due to the amplification of the increase or decrease of the sensor output signal by the large amplification gain, and which keeps a constant defined by either the upper or lower operational limit due to the amplification of the sensor output by the large amplification gain inviting an excess of either the upper or lower operational limit. As explained in the first embodiment, these upper and lower operational limit are determined by a source voltage $V_{DD}$ applied to the operational amplifier 8.

According to the present embodiment, the reference voltage changing circuit includes the up/down counter 41, the digital/analog conversion circuit 42 to set the reference voltage VS corresponding to the counted value by the counter 41, the comparators 32 and 34 to change the counted value of the up/down counter 41 when the alternating output signal of the operational amplifier 8 deviates from the predetermined amplitude range relative to the amplitude center thereof, and the RC oscillation circuit for generating a clock signal 40. Because the reference voltage changing circuit includes a digital processing circuit and a capacitor is not necessary, the structure of the reference voltage changing circuit can be simplified.

As an applied embodiment of the present invention, the aforementioned first embodiment describes the reference voltage changing circuit, which is miniaturized on a single chip using a bipolar IC technology; however, miniaturization to a single chip can be also obtained by CMOS construction.

Although the present invention has been fully described in connection with the preferred embodiments thereof with reference to the accompanying drawings, it is to be noted that various changes and modifications will become apparent to those skilled in the art. Such changes and modifications are to be understood as being included within the scope of the present invention as defined by the appended claims.

What is claimed is:

1. A sensor signal processor comprising:

an amplifier circuit having an upper limit output value and a lower limit output value, a difference between an alternating sensor output signal from a sensor and a reference voltage is amplified according to a differential gain set in said amplifier circuit to exceed both said upper limit output value and said lower limit output value and a signal representing said difference is outputted as an output signal from said amplifier circuit;

a converting circuit for converting said output signal from said amplifier circuit into a binary-valued signal by comparing said output signal with a threshold value; and a reference voltage changing circuit for changing said reference voltage based on a magnitude of said output signal between an upper limit value and a lower limit value, wherein said output signal from said amplifier is saturated on both said upper limit output value and said lower limit value of said amplifier circuit with said reference voltage set to said upper limit value or said lower limit value.

2. A sensor signal processor according to claim 1, wherein said reference voltage changing circuit comprises:
- a capacitor connected to an input terminal of said amplifier circuit for applying said reference voltage to said amplifier circuit; and
- a capacitor voltage adjusting circuit which selectively charges and discharges said capacitor to change said reference voltage when said output signal from said amplifier circuit deviating from the predetermined amplitude range defined by said upper limit value and said lower limit value.

3. A sensor signal processor according to claim 1, wherein said reference voltage changing circuit comprises:
- a counter circuit;
- a digital/analog conversion circuit for setting said reference voltage corresponding to a counted value by said counter circuit; and
- a counted value changing circuit for changing said counted value of said counter circuit when said output signal from said amplifier circuit deviates from a predetermined amplitude range defined by said upper limit value and said lower limit value.

4. A sensor signal processor according to claim 2, wherein said capacitor voltage adjusting circuit comprising:
- a first switch for changing said capacitor;
- a second switch for discharging said capacitor;
- a first detecting circuit for detecting that said output signal from said amplifier circuit is more than said upper limit value of said reference voltage;
- a second detecting circuit for detecting that said output signal from said amplifier circuit is less than said lower limit value of said reference voltage; and
- an enabling circuit for driving at least one of said first switch and said second switch in accordance with detection results of said first and said second detecting circuits.

5. A sensor signal processor according to claim 4, wherein said first and said second switches include transistors.

6. A sensor signal processor according to claim 1, wherein said reference voltage changing circuit changes said reference voltage to that said reference voltage approaches said alternating sensor output signal when said output signal from said amplifier circuit deviates from a predetermined amplitude range defined by said upper limit values and said lower limit value.

7. A sensor signal processor according to claim 3, wherein said counted value changing circuit comprises:
- a comparator which detects that said output signal from said amplifier circuit deviates from said predetermined amplitude range, and
- a feedback resistor connected between an input and an output terminal of said comparator.

8. A sensor signal, comprising:
- an amplifier circuit having an operational limit value and a differential gain, said amplifier circuit receiving a sensor output signal from a sensor and a reference voltage, said amplifier circuit determining a difference between said sensor output signal and said reference voltage, said amplifier circuit generating an output signal after amplifying said difference between said sensor output signal and said reference voltage based on said differential gain set so as to exceed said operational limit value;
- a converting circuit for converting said output signal from said amplifier circuit into a binary-valued signal by comparing said output signal with a threshold; and
- a reference voltage changing circuit for judging whether said output signal from said amplified circuit is within a predetermined amplitude range and for changing said reference voltage so as to correspond more closely to said output signal of said amplifier circuit responsive to said output signal from said amplifier circuit deviating from said predetermined amplitude range, wherein said reference voltage changing circuit comprises:
- a capacitor connected to an input terminal of said amplifier circuit for applying said reference voltage to said amplifier circuit; and
- a capacitor voltage adjusting circuit which selectively charges and discharges said capacitor to change said reference voltage responsive to said output signal from said amplifier circuit deviating from said predetermined amplitude range.

9. A sensor signal processor according to claim 8, wherein said capacitor voltage adjusting circuit comprises:
- a first switch for charging said capacitor;
- a second switch for discharging said capacitor;
- a first detecting circuit which executes a first detection operation for detecting that said output signal from said amplifier circuit is more than an upper limit value in said predetermined amplitude range;
- a second detecting circuit which executes a second detection operation for detecting that said output signal from said amplifier circuit is less than a lower limit value in said predetermined amplitude range; and
- an enabling circuit for driving least one of said first switch and said second switch in accordance with said first detection operation of said first detecting circuit and said second detection operation of said second detecting circuit.

10. A sensor signal processor according to claim 9, wherein said first switch and said second switch include at least one transistor.

11. A sensor signal processor according to claim 9, wherein:
- said enabling circuit actuates said second switch and deactuates said first switch responsive to said first detecting circuit detecting that said output signal from said amplifier circuit is more than said upper limit value, and
- said enabling circuit actuates said first switch and deactuates said second switch responsive to said second detecting circuit detecting that said output signal from said amplifier circuit is less than said lower limit value.

12. A sensor signal processor according to claim 8, wherein said reference voltage changing circuit comprises:
- a counter circuit for generating a count value;
- a digital/analog conversion circuit for setting said reference voltage in accordance with said count value generated by said counter circuit; and
- a counted value changing circuit for changing said count value of said counter circuit responsive to said output signal from said amplifier circuit deviating from said predetermined amplitude range.

13. A sensor signal processor according to claim 8, further comprising:
- threshold varying means for setting said threshold to a predetermined value.

14. A sensor signal processor according to claim 13, wherein said threshold varying means is an analog switch.

15. A sensor signal processor according to claim 8, further comprising:

threshold varying means for switching said threshold to one of two predetermined values.

16. A sensor signal processor comprising:

an amplifier circuit having an operational limit value and a differential gain, said amplifier circuit receiving a sensor output signal from a sensor and a reference voltage, said amplifier circuit determining a difference between said sensor output signal and said reference voltage and generating an output signal after amplifying said difference between said sensor output signal and said reference voltage based on said differential gain;

a converting circuit for converting said output signal from said amplifier circuit into a binary signal by comparing said output signal with a threshold; and a reference voltage changing circuit for judging whether said output signal from said amplified circuit is within a predetermined amplitude range and for changing said reference voltage so as to correspond more closely to said output signal of said amplifier circuit responsive to said output signal from said amplifier circuit deviating from said predetermined amplitude range, said reference voltage changing circuit including a capacitor connected to an input terminal of said amplifier circuit for applying said reference voltage to said amplifier circuit and a capacitor voltage adjusting circuit which selecting charges and discharges said capacitor to change said reference voltage responsive to said output signal from said amplifier circuit deviating from said predetermined amplitude range.

\* \* \* \* \*